2,867,482

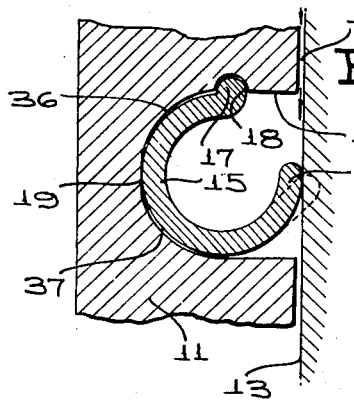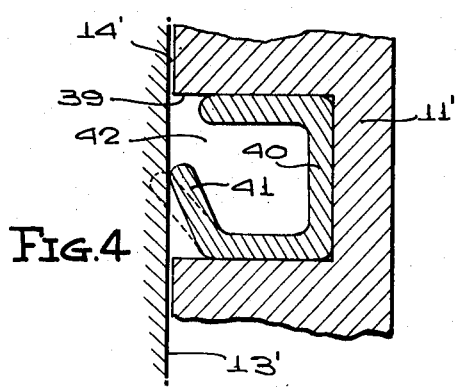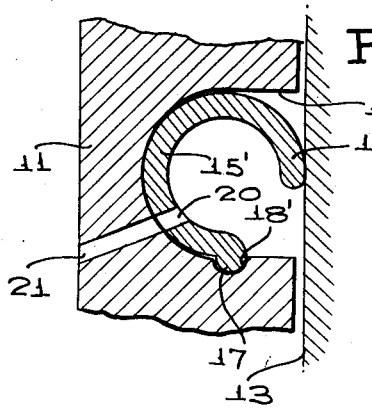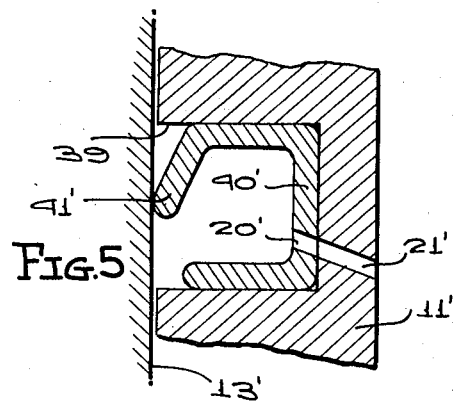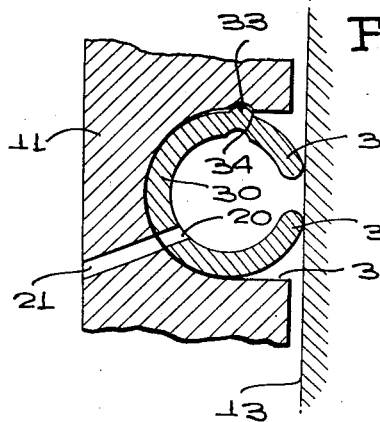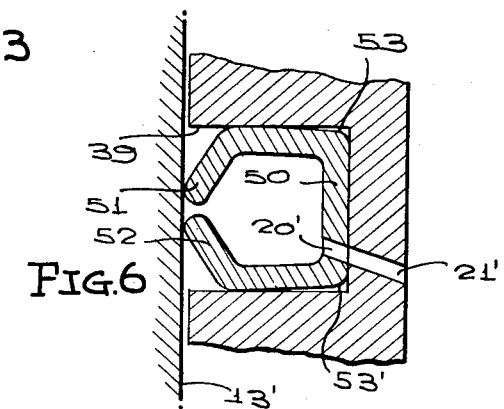
INVENTOR
JOSEPH J. SCHMIDT Jan. 6, 1959 J. J. SCHMIDT 2,867,482
PISTON RINGS
Filed Jan. 31, 1958 2 Sheets-Sheet 2
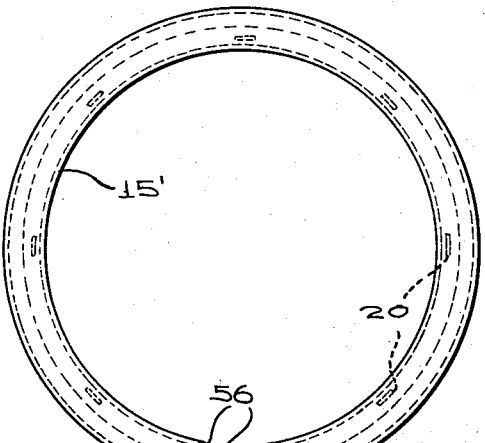
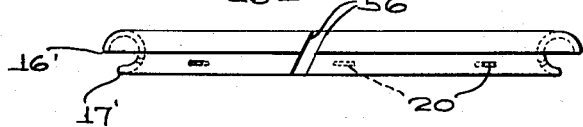
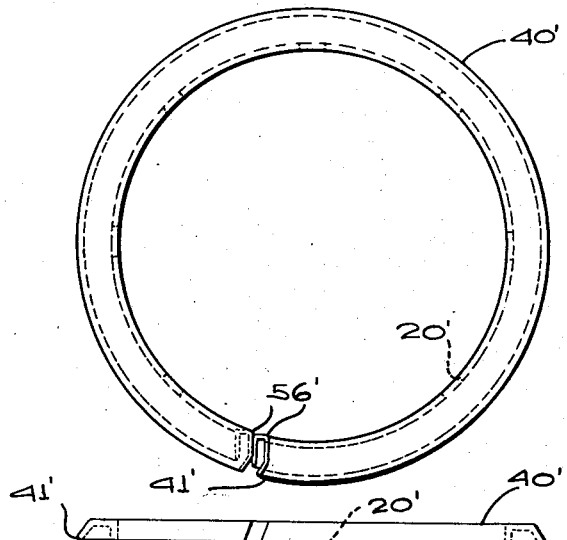
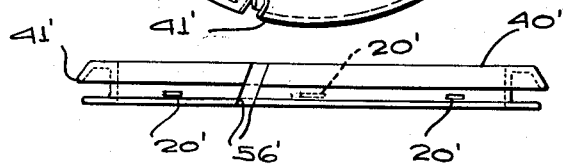
INVENTOR
JOSEPH J. SCHMIDT
ATTORNEYS United States Patent Office 2,867,482
Patented Jan. 6, 1959

PISTON RINGS

Joseph J. Schmidt, Willoughby, Ohio

Application January 31, 1958, Serial No. 712,530

5 Claims. (Cl. 309—44)

This invention relates to piston rings, and more particularly to piston rings of the type having resilient sealing elements adapted to slidably and sealingly engage the inside wall surface of a cylinder.

The main object of the invention is to provide a novel and improved piston ring which is simple in construction, which is easy to install, and which allows the ring to seat itself automatically regardless of deformation of the cylinder in which the ring is used and regardless of temperature effects.

A further object of the invention is to provide an improved piston ring of the spring type, said piston ring being adapted to maintain an efficient seal over a wide range of temperature conditions and under conditions of substantial wear, the piston ring being relatively inexpensive to manufacture due to the fact that close tolerances are not necessary, being durable in construction, and being manufacturable by stamping, spinning, or other well known operations.

Further objects and advantages of the invention will become apparent from the following description and claims, and from the accompanying drawings, wherein:

Figure 1 is a transverse cross sectional view taken through a portion of a piston and the adjacent cylinder wall, said portion being provided with an improved piston ring constructed according to the present invention, the piston ring being shown in transverse cross section.

Figure 2 is a cross sectional view, similar to Figure 1, but showing a modified form of piston ring according to this invention, provided with a relief port to allow oil drainage through the piston.

Figure 3 is a transverse vertical cross sectional view of structure similar to Figure 2 but showing a modification thereof.

Figure 4 is a transverse vertical cross sectional view taken through a portion of a piston provided with a further modified form of piston ring according to the present invention.

Figure 5 is a cross sectional view, similar to Figure 4, but showing a piston ring provided with an oil relief opening to allow oil drainage back through the piston.

Figure 6 is a cross sectional view of the structural arrangement generally similar to Figure 5, but showing a further modification of the piston ring.

Figure 7 is a plan view of the piston ring of Figure 2.

Figure 8 is an elevational view of the piston ring shown in Figure 7.

Figure 9 is a plan view of the piston ring of Figure 5.

Figure 10 is an elevational view of the piston ring shown in Figure 9.

Referring to the drawings, and more particularly to Figure 1, 11 designates a piston formed with an annular piston ring groove 12, the piston being located in a cylinder 13. The groove 12 may be the second groove in a standard piston groove arrangement, whereby compressed gas may escape past the standard top compression ring of the piston through clearance shown at 14, and may enter the space within the groove 12.

Designated at 15 is an annular piston ring according to the present invention, said piston ring being generally C-shaped in cross sectional shape and opening outwardly away from its center. The annular body comprising the piston ring 15 is formed of suitable resilient material, such as resilient metal, or the like. The ring is thus provided with a resilient outer marginal flange portion 16 which is adapted to sealingly and yieldably engage against the wall surface of the cylinder 13, and to flex in accordance with irregularities of said wall surface. The opposite margin of the ring 15 is formed with an outwardly projecting rib 17 which is lockingly engaged in an annular sub-groove 18 formed in the top wall of the main piston ring groove 12, as viewed in Figure 1, whereby the piston ring 15 is locked in the groove.

As shown in Figure 1, the piston ring sealingly engages against a relatively flat inner wall portion 19 provided in the groove 12, and also sealingly engages against the cylinder wall at the resilient flange portion 16. Thus, an effective sealing action is provided between the cylinder wall and the flattened surface 19 of the piston groove. The sealing action is further aided by the force of the compressed gas entering the groove through the clearance space 14, which acts against the flange 16 and urges same tightly against the cylinder wall.

Figure 1 shows in dotted view the normal free position of the sealing flange 16 of the piston ring 15, indicating that the flange 16 is flexed inwardly when it is engaged in the cylinder 13 and exerts substantial sealing force on the cylinder wall. The force of the compressed gases entering the cylinder groove 12 through the clearance space 14 further acts to urge the flange 16 sealingly against the cylinder wall.

Figure 2 illustrates a piston ring 15' similar to the piston ring 15 previously described but formed with a plurality of oil relief openings 20 which are aligned with the oil passages 21 of the piston 11, whereby oil is allowed to flow back through the piston through the registering openings 20 and 21. Thus, the ring 15' may be employed as one of the oil wiper rings of the piston. As shown in Figure 2, the ring 15' is provided with the resilient outer flange portion 16' which sealingly engages against the cylinder wall, and is provided opposite the flange 16' with the outwardly projecting rib 17' which is lockingly engaged in a sub-groove 18' provided in the main annular piston ring groove 12'.

The form of the invention illustrated in Figure 3 comprises a piston ring 30, generally similar to the piston ring 15' but provided with the additional resilient outer sealing flange element 31 which cooperates with the resilient opposite sealing flange 32 of the ring to sealingly engage against the cylinder wall. The ring 30 is provided with the oil relief openings 20 which register with the oil passages 21 of the piston to allow oil to flow back through the piston, whereby the ring 30 may be employed as one of the oil wiper rings on the piston. The ring 30 is provided with the outwardly projecting locking rib 33 which lockingly engages in a sub-groove 34 formed in the upper wall of the main piston ring groove 35 illustrated in Figure 3.

The piston ring grooves 12, 12' and 35, shown in Figures 1, 2 and 3 are generally arcuately curved at their inner portions, whereby the piston rings 15, 15' and 30 are similarly curved in transverse cross sectional shape to generally conform with the curvature of the grooves. However, as will be shown particularly in Figures 1 and 3, clearance spaces are provided above and below the points of contact of the piston ring respectively with the piston and cylinder wall, for example, as shown at 36 and 37 Figure 1, to allow for heat expansion of the piston ring.

Figure 4 shows a form of the invention wherein the piston, designated at 11' is formed with annular piston ring grooves 39 which are generally rectangular in transverse cross sectional shape. Seated in the grooves are annular piston rings 40 of cross sectional shape generally conforming to that of the groove 39, the rings being generally C-shaped in cross section and opening outwardly, as in the case of the rings previously described. The piston ring 40 is provided with the resilient outwardly projecting sealing flange 41 which slidably and sealingly engages against the inside surface of the cylinder 13', providing sealing contact therewith. The ring 40 is used in the same manner as the piston ring 15 previously described, namely, as a second ring on the cylinder, whereby compressed gases bypassing through the clearance space 14' enter the space in the piston ring groove 42 and exert sealing force on the flange element 41, tending to urge the flange sealingly against the cylinder wall.

In the form of the invention shown in Figure 5, the piston ring is generally similar to that illustrated in Figure 4, and is designated at 40'. The piston ring has the resilient sealing flange 41' which sealingly and slidably engages against the cylinder wall. The ring 40' is further formed with an oil relief opening 20' which registers with the oil passage 21' of the piston 11', whereby the ring 40' is employed as an oil wiper ring. In the arrangement illustrated in Figure 5, the sealing flange 41' is the upper marginal portion of the sealing ring 40', whereas in the arrangement of Figure 4, the resilient sealing flange 41 is the lower marginal portion of the ring.

In the form of the invention illustrated in Figure 6, the piston ring, designated at 50, is generally pentagonal in transverse cross sectional shape, but opens outwardly, being provided with the top and bottom resilient sealing flanges 51 and 52 which sealingly and slidably engage against the wall of the cylinder 13'. As in the embodiment shown in Figure 5, the inner portion of the sealing ring 50 is formed with an oil relief opening 20' which registers with the oil passage 21' of the piston, whereby the ring 50 may be employed as an oil wiper ring. The ring 50 tapers inwardly in height, to define clearance spaces 53, 53' above and below the inner portions of the ring, providing space for heat expansion of the ring.

The various embodiments of the improved piston rings above described may be readily formed in any suitable manner, for example, by stamping, spinning, or the like. The rings are preferably split to define the angled parallel opposing end portions 56, 56, as shown in Figures 7 and 8, whereby the rings may be flexed, as required, to install same on the pistons using same. As shown in Figures 9 and 10 the rings for the rectangular piston grooves, are similarly formed with the parallel inclined end edge portions 56' to allow the rings to be flexed so as to be mounted in the piston ring grooves.

While certain specific embodiments of an improved piston ring have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a cylinder, a piston mounted in said cylinder, said piston being formed with an annular piston ring groove, the wall of said groove being further formed with a substantially smaller annular sub-groove, an annular body of generally C-shaped cross section mounted in said first-named groove and opening outwardly, a rib on said body engaged in said sub-groove, and a resilient outer marginal flange on said body sealingly and yieldably engaged with the inside wall of said cylinder.

2. In combination, a cylinder, a piston mounted in said cylinder, said piston being formed with an annular piston ring groove, the wall of said groove being further formed with a substantially smaller annular sub-groove, an annular body of generally C-shaped cross section mounted in said first-named groove and opening outwardly, a rib on said body engaged in said sub-groove, and a resilient outer marginal flange on said body sealingly and yieldably engaged with the inside wall of said cylinder, said piston being formed with an oil passage and the body being formed with an aperture registering with said oil passage.

3. In combination, a cylinder, a piston mounted in said cylinder, said piston being formed with an annular piston ring groove, the wall of said groove being further formed with a substantially smaller annular sub-groove, an annular body of generally C-shaped cross section mounted in said first-named groove and opening outwardly, a rib on one edge of said body engaged in said sub-groove, and a resilient outer marginal flange on said body opposite said rib sealingly and yieldably engaged with the inside wall of said cylinder.

4. In combination, a cylinder, a piston mounted in said cylinder, said piston being formed with an annular piston ring groove, the wall of said groove being further formed with a substantially smaller annular sub-groove, an annular body of generally C-shaped cross section mounted in said first-named groove and opening outwardly, a rib on said body engaged in said sub-groove, and resilient outer marginal flanges on said body sealingly and yieldably engaged with the inside wall of said cylinder.

5. In combination, a cylinder, a piston mounted in said cylinder, said piston being formed with an annular piston ring groove, the wall of said groove being further formed with a substantially smaller annular sub-groove, an annular body of generally C-shaped cross section mounted in said first-named groove and opening outwardly, a rib on said body engaged in said sub-groove, and resilient outer marginal flanges on said body sealingly and yieldably engaged with the inside wall of said cylinder, said piston being formed with an oil passage and the body being formed with an aperture registering with said oil passage.

References Cited in the file of this patent

UNITED STATES PATENTS

| | | |
|---|---|---|
| 2,428,491 | Grant | Oct. 7, 1947 |

FOREIGN PATENTS

| | | |
|---|---|---|
| 593,392 | Great Britain | Oct. 15, 1947 |
| 740,375 | Great Britain | Nov. 9, 1955 |